Patented June 21, 1932

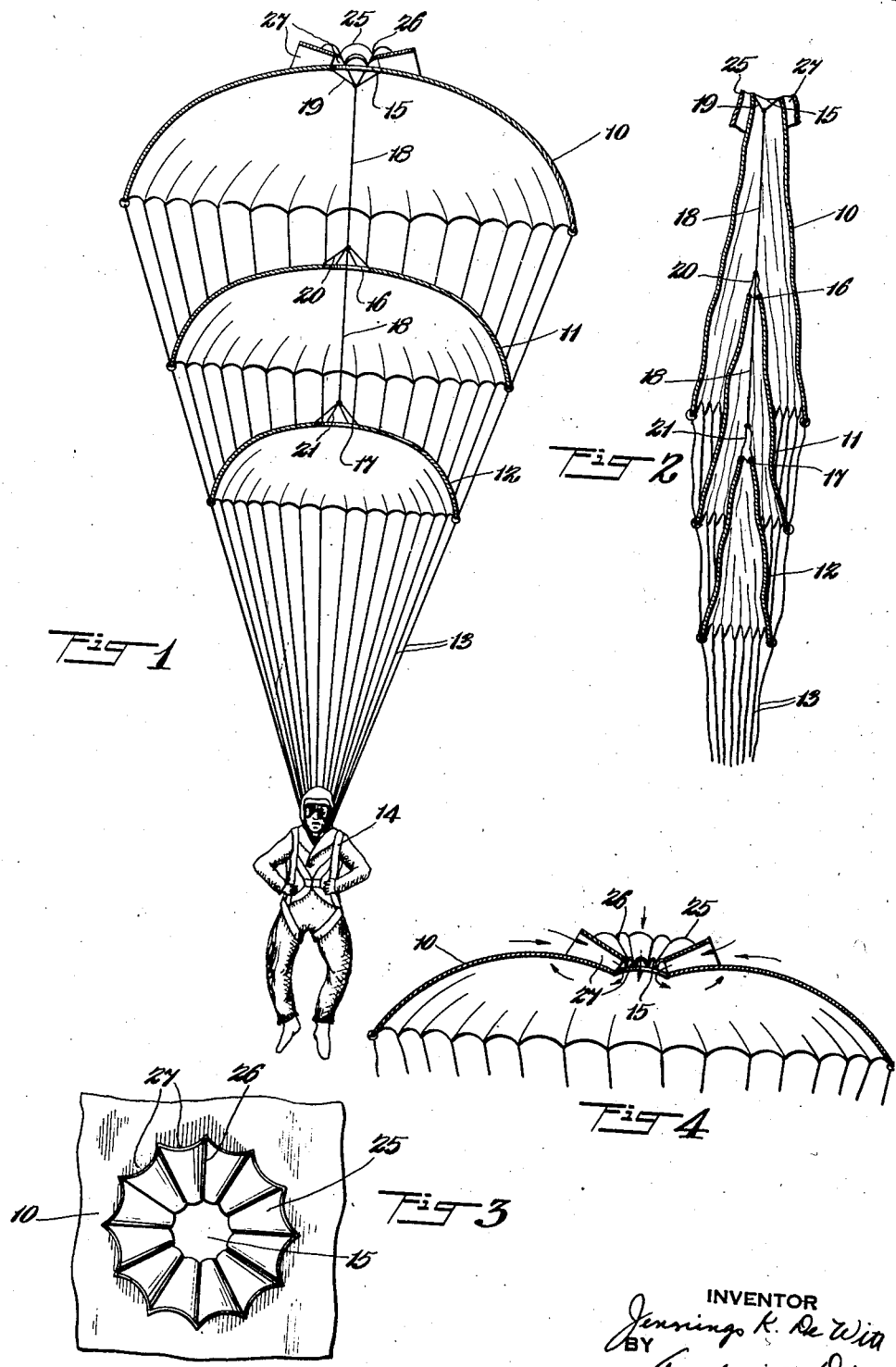

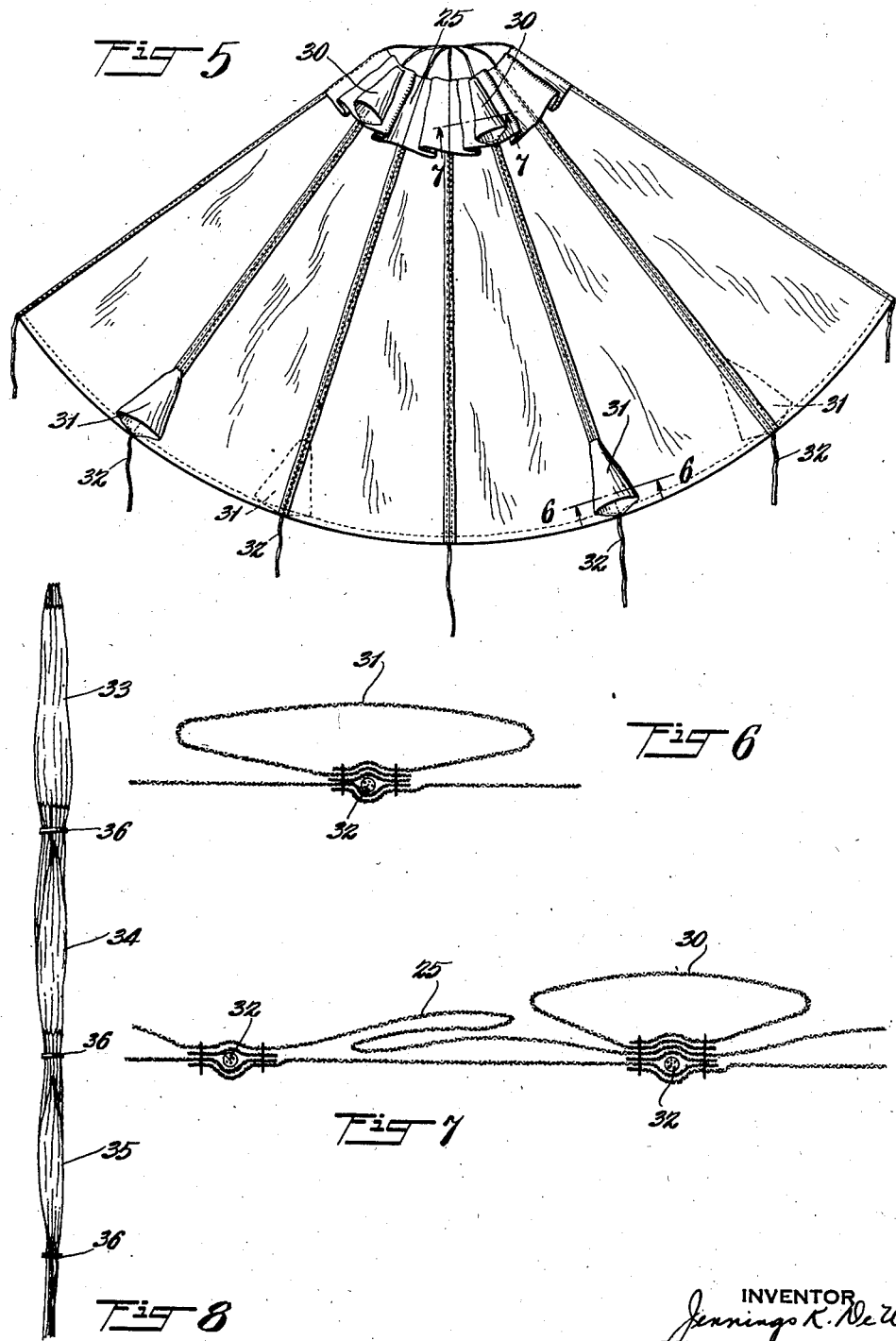

1,864,298

UNITED STATES PATENT OFFICE

JENNINGS K. DE WITT, OF NEW YORK, N. Y.

PARACHUTE OPENING DEVICE

Application filed July 14, 1930. Serial No. 467,786.

This invention relates to parachutes, and more particularly to a parachute opening device which is capable of causing the parachute to open by applying air to the various parts thereof, whereby the correct operation of the parachute is assured.

The invention provides a mechanism incorporated with the parachute canopy which prevents collapse of the canopy when the air enters the periphery thereof by applying air to the central portion so that the various portions are rendered operative practically simultaneously. The invention also provides means for preventing the ropes from becoming tangled and for preventing the parachute from turning wrong side out due to the premature opening of the peripheral portion with respect to the center. The invention is particularly applicable to a multiple chute having a plurality of canopies which are so interconnected that relative displacement is prevented.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a transverse sectional view of a multiple canopy chute in operative position;

Fig. 2 is a transverse sectional view of a similar chute in partly opened position;

Fig. 3 is a top plan view of the air pockets formed at the top of the chute;

Fig. 4 is a transverse sectional view of the chute with the air pockets in operative position;

Fig. 5 is a partial plan view of a modified form of chute having air pockets at the top and at the periphery.

Fig. 6 is a section taken on the line 6—6 of Fig. 5;

Fig. 7 is a section taken on the line 7—7 of Fig. 5; and

Fig. 8 is an elevation of a modified form of chute in closed position.

Like reference characters denote like parts in the several figures of the drawings.

In the following description and in the claims parts will be identified by specific names for convenience, but they are intended to be as generic in their application to similar parts as the art will permit.

Referring to the drawings more in detail, the invention is shown in Figs. 1 to 4 as applied to a multiple chute having a plurality of canopies 10, 11 and 12 which are interconnected by lines 13 to a suitable harness of standard construction which is worn by the aviator. Canopies 10, 11 and 12 are provided at their center with openings 15, 16 and 17, respectively, by which the proper air currents are obtained. Interconnecting central portions of said canopies is a line 18 having extensions 19, 20 and 21 which engage canopies 10, 11 and 12, respectively, adjacent the openings 15, 16 and 17. Said line 18 is adapted to maintain the central portions of the canopies in their correct relative positions and prevent the lower canopies 11 and 12 from sagging when the periphery thereof becomes distended due to the entrance of air while opening.

At the center of canopy 10 adjacent opening 15 is provided a member 25 which is secured to the canopy along a plurality of lines 26 and is sufficiently loose to form pockets 27 (Figs. 1 to 4) when distended. Said pockets have open ends and are so formed that as the chute begins to open in the position illustrated in Fig. 2 air enters pockets 27 and distends the same thereby lifting the center of the canopy and preventing the canopy from collapsing and at the same time causes an air current to pass through said pockets and into opening 15, thereby filling the center of the chute and producing an air pressure internally thereof.

Line 18 which is connected adjacent the center portion of the canopies transmits a portion of the weight of the lower canopies to a point on canopy 10 where it is supported by air pockets 27. The pockets, therefore, serve to hold the center portions of the entire set of canopies in proper position to receive air and prevent any one of the canopies from collapsing or turning wrong side out while the parachute is opening.

When the parachute is folded it is to be noted that line 18 causes the various canopies to partially overlap as shown in Fig. 2, in which position they may be readily folded without danger of the lines becoming tangled.

Returning to the modified form of chute shown in Fig. 5, the member 25 is shown as secured to the upper portion of the canopy adjacent the central opening in a manner similar to that described above. At certain of the lines of attachment of said member 25 additional cones 30 of flexible material are secured and are adapted to assist the air pockets 27 in lifting the center portion of the chute. Said cones 30 are also provided with open ends and serve to direct air to the center of the chute in the manner set forth in connection with pockets 27 above.

For assisting in opening the periphery of the chute a plurality of additional cones 31 are secured adjacent the periphery thereof and are adapted to form air pockets and hold the edge of the chute in distended position to permit the air to be applied thereunder. The above elements are shown as attached adjacent lines 32 which are secured at convenient intervals in the canopy in a manner well known in the art. It is obvious, however, that they may be attached at other points if convenient.

Referring to Fig. 8, a parachute is disclosed which is constructed similar to the chute of Fig. 2 but with the canopies 33, 34 and 35 spaced a sufficient distance so that they do not overlap when the chute is collapsed. In order to assist in folding such a chute and to prevent the lines from becoming tangled when the chute opens, a plurality of elements 36 of thin flexible material having but small tensile strength are secured around the cords at points intermediate the canopies. Gummed paper or other similar material is particularly suitable for this purpose. When such a chute opens the strips 36 prevent the lines from becoming loose until the canopies have opened sufficiently to apply a slight amount of pressure thereto. After this condition is reached the lines are held tight by the normal action of the chute and no further restraining means is required.

In the above described chute air pressure is applied to both the periphery and the central portion at the same time and the chute is caused to fill with air and assume an open position without danger of improper operation. This is particularly important in a multiple chute of the type shown inasmuch as improper operation of one of the canopies of such a chute would render the entire device useless. Furthermore, the various canopies should open at approximately the same instant in order to avoid tangling of the lines or undue strain on any of the parts. Such operation would be difficult to obtain unless positive means were employed for applying air to the center of the canopy at the same time that air enters the periphery thereof.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a parachute, a canopy having a central aperture therein, and a member disposed around said aperture and forming air pockets which become distended when the chute is released and support the center portion of the canopy and also apply air currents downwardly through said aperture for preventing collapse of said canopy.

2. In a parachute, a canopy having a central aperture, a member surrounding said aperture and joined to said canopy along spaced radial lines, said member extending loosely over said canopy to form air pockets when distended, and additional members attached to said canopy along certain of said lines, said additional members forming air pockets to assist in the support of the central portion of said canopy when said chute is being opened.

In testimony whereof I have hereunto set my hand.

JENNINGS K. DE WITT.